United States Patent Office 3,171,783
Patented Mar. 2, 1965

3,171,783
DIAGNOSTIC PROCEDURE
Roy Thomas Fisk, Glendale, Calif., assignor to
Hyland Laboratories
No Drawing. Filed Aug. 15, 1962, Ser. No. 216,962
1 Claim. (Cl. 167—84.5)

This invention is concerned with an immuno-chemical pregnancy test.

Pregnancy tests, in general, are based on the determination of hormones which are produced by the developing placenta, such as gonadotropic hormones similar to those produced by the anterior pituitary gland and steroid hormones similar to those of the ovary and adrenal gland. The majority of currently employed pregnancy tests are based upon assay for the placental hormone, human chorionic gonadotropin (HCG).

Human chorionic gonadotropin (HCG) is a hormone which is found in body fluids (blood serum and urine) only during pregnancy and when rare hormone-producing tumors are present. An International Unit (I.U.) of HCG was adopted in 1938 and is defined as the specific gonadotropic activity of 0.1 mg. of a dried standard kept at the National Institutes of Health, London, England.

Human chorionic gonadotropin (HCG) is generally considered to be detectable in the urine about the twenty-fourth day of the gestation period. However, one should be mindful that the "detectability" of HCG in urine is influenced by the concentration of the HCG and the sensitivity of the particular test system employed. The twenty-fourth day of the gestation period is usually about the tenth day after ovulation, but is called the twenty-fourth day because gestation is conveniently calculated from the first day of the last normal menstrual period. By the fortieth day, HCG in urine may reach a level of about 5,000 I.U. per twenty-four hours; from day sixty to day seventy there is a very high peak, which may reach 500,000 I.U. per twenty-four hours. While this peak more commonly occurs at sixty to seventy days, it may be present at any time between fifty and ninety days; it rarely exceeds ten days in duration. For the remainder of pregnancy the level normally ranges between 4,000 and 11,000 I.U. per twenty-four hours.

The variety of tests currently used for the diagnosis of pregnancy affords ample evidence that an "ideal" procedure has not yet been achieved. Historically, the most commonly employed test procedures have been based upon the response of various experimental animals to hormonal substances contained in the body fluids (urine and blood serum) during pregnancy. The first of these so-called biologic tests to be developed was designated the Ascheim-Zondek or "A–Z" Test. In this test urine from a suspected pregnancy is injected into immature female mice. There then followed the Friedman Test in which mature, non-pregnant and non-estrus female rabbits replaced mice as the test animal. In both mice and rabbits, the HCG causes ovulation and corpus luteum formation, a response which is observed upon the sacrifice and examination of the animals to determine the presence of corpora lutea in mice and hemorrhagic follicles in rabbits, both of which indicate a positive test.

In recent years, various species of frogs and toads of both sexes have been used for pregnancy testing. Although these animals are relatively insensitive as compared to mice and rabbits, they are at this time possibly the most commonly used animals for biologic tests since they pose fewer problems in storing and handling.

The A–Z mouse and Friedman tests are capable of detecting levels of HCG of about 750 I.U. of urinary HCG per twenty-four hours. HCG levels of this order can be detected with toads and frogs only if adequate volumes of urine are grossly concentrated.

The sensitivity of various animals to HCG is dependent upon a number of factors, including species, maturity, weight, season, environment, reuse, health and route of administration. Perhaps the most serious handicaps incident to the use of biologic pregnancy tests is the propensity of such tests to give false positive reactions. Such false positive reactions in pregnancy test animals are positive responses to substances other than HCG. For example, false positive reactions are noted with mice and rabbits when high levels of follicle stimulating hormone (FSH) are present. Such FSH may be present in large amounts in menopausal patients or patients with primary ovarian failure. It is generally believed that a false positive reaction in a pregnancy test may have serious consequences because of the possibility of considerable psychological trauma to the patient. For this reason and for the other reasons, hereinbefore mentioned, attempts have been made to develop non-biologic pregnancy tests.

One class of non-biologic pregnancy tests involves the use of immunological or immunochemical techniques. Since HCG is a protein hormone, it acts antigenically in a heterologous species. That is, when HCG is injected by suitable techniques into a suitable animal, as for example a rabbit, antibody to HCG is produced. This antibody to HCG, under proper conditions, will combine with HCG to form a visible precipitate. In theory, this describes a classic antigen-antibody direct precipitin reaction. However, when related to the practicality of the determination of pregnancy in a human patient, this theoretical perfection becomes imperfect. The direct precipitin reaction is not sufficiently sensitive to detect, in unconcentrated urine, the relatively low levels of HCG that are present in such urine during early stages of pregnancy. When, in order to increase the I.U. of HCG per unit volume of urine, the urine is concentrated to a smaller volume, substances which interfere with the precipitation reaction likewise become more concentrated.

Difficulties attendant to the use of a direct precipitin pregnancy test have led to the evolution of so-called indirect tests. Such indirect tests are based essentially on an inhibition phenomenon. In such tests, antiserum to HCG is added to a patient's urine. A urine specimen from a pregnant woman will contain HCG. The HCG in such a specimen neutralizes the HCG antibodies in the antiserum that has been added to the urine. Thus a carrier (latex or sensitized cells) which has been coated with HCG is not agglutinated following addition of the coated carrier to the urine specimen. Had the urine specimen been from a non-pregnant woman, the added HCG antibodies from the added HCG antiserum would have been present at the time of the addition of the HCG coated carrier, and agglutination would have occurred. Although indirect tests such as these are useful for the diagnosis of pregnancy, they have certain limitations. In general, the urine to be tested must be the first morning urine. It is in such first morning urine that the HCG appears in the highest concentration. Urine passed after the first morning urine generally contains too low a concentration of HCG to be useful for indirect diagnostic tests. For the same reasons as pertained for the direct precipitin test, it is not possible to artificially concentrate low specific gravity urines for use in indirect tests.

It is an object of this invention to provide a direct (as opposed to indirect or inhibition) test for pregnancy.

It is a further object to provide for the diagnosis of pregnancy a direct test that is based upon immunochemical principles and that includes the use of gel diffusion techniques.

It is another object to provide an immunochemical direct pregnancy test that employs urine as a test specimen, but does not limit the specimen to the first morning urine.

It is yet another object to provide novel equipment and methodology for immunochemical direct pregnancy testing.

It is yet another object to provide a pregnancy test which minimizes the likelihood of false-positive results.

Other objects and advantageous features will become apparent from the following detailed description and illustrative examples.

The instant inventive concept is based upon the immunological reaction between HCG and antiserum to HCG, the reaction taking place in semi-solid media utilizing the technique of immunodiffusion. In the diagnosis of pregnancy employing this inventive concept, urine is employed as the test substrate. The HCG, if present in the urine, is concentrated by adsorption on an appropriate adsorbent and by elution from the adsorbent preferably using a total volume of eluting agent substantially smaller than was the volume of the urine specimen. A small amount of the HCG-containing eluate is then introduced into or onto a defined space in or on a semi-solid medium which contains antibody to HCG. The HCG in the eluate diffuses through the semi-solid medium and thereby contacts the antibody to HCG. This contact between HCG and antibody to HCG results in the formation of a visible precipitate, indicating pregnancy.

Several types of semi-solid media can be used for immunodiffusion. Representative of gelling agents for such media are agar, gelatin, pectin and chemicals which polymerize to gel when catalysts are added to their aqueous solutions. Undoubtedly, many other gelling agents could be used, since precipitin tests can be carried out in or on any substance through which antigen or antibody can diffuse in aqueous solution. The semi-solid medium should not substantially interfere physically or chemically with uniform antigen (HCG) diffusion. Optimally the gelling agent is, therefore, uncharged or negatively charged and the resulting gel is of a cohesive structure, having characteristics such that it will permit the passage of macromolecules such as antigens. Agar is the preferred gelling agent in the practice of the present invention, because it satisfies all of the above criteria. In the description which follows agar is employed as illustrative of satisfactory gelling agents.

In the instant invention, agar which has been made fluid by heating, and antiserum to HCG are admixed. The HCG antiserum is prepared in a conventional way by inoculating an appropriate animal with HCG which can either be relaitvely pure or relatively impure. Rabbits, horses, goats and sheep have been found to be appropriate animals. Perhaps the highest specific activity reported for an HCG preparation is 12,000 I.U. per milligram. Such a preparation is essentially a laboratory curiosity. The nonantigenically specific HCG preparations normally employed for the production of HCG antiserum contain on the order of 2,000 to 9,000 I.U. per milligram. The HCG antiserum produced through the use of nonantigenically specific HCG, of the order of about 2,500 I.U. contains substantial amounts of antibodies to the non-HCG antigens contained in the HCG preparation. These antibodies to non-HCG antigens must be removed from the HCG antiserum since they may give a false positive pregnancy indication by forming a precipitate when brought into contact with their corresponding non-HCG antigens which may be present in nongravid urine. Normally, this removal would be accomplished by conventional means, using a concentrate of male and postmenopausal and nongravid premenopausal female urine to adsorb the non-HCG antibodies. In the instant invention, when an HCG preparation of relatively low IU content (on the order of 2,500 I.U. per milligram) is employed for the production of antiserum, it is preferable to adsorb with nongravid human serum.

The antiserum to HCG thus obtained is then admixed with the agar. HCG of the order of 8,000 I.U. per milligram produces antisera with a sufficiently low non-HCG antibody content that adsorption is not required for the successful application of the antisera to the gel diffusion technique of this invention.

Also admixed with the agar is glycine in an amount sufficient to prevent the formation of precipitates which can result from the interaction of the agar and certain substances that are normally present in the body fluids employed for diagnosis of pregnancy. Such interaction results in the formation of precipitates which can be misinterpreted as evidence of pregnancy, a so-called false-positive. Seventy-five grams of glycine per 1,000 ml. of agar will function to inhibit this interaction.

Additionally, when it is inadvisable to autoclave and thereby heat-sterilize the agar with the admixed glycine and HCG antiserum, microbiological contamination can be avoided by the addition to the agar of a preservative agent such as sodium azide.

In the practice of the invention, melted agar, to which has been added antiserum to HCG, glycine, and a preservative, is added into an appropriate container and is allowed to solidify. To be appropriate, a container preferably will be capable of receiving the molten agar and restraining it in a form such that the agar will have a uniform depth throughout. Also, the vertical walls of this container preferably will be of a height such that when the container is completely filled with agar the depth of the agar does not exceed about 1/8 inch. In a preferred embodiment, small wells of, for example, about 1/16 inch diameter are punched in the agar. For quantitation the wells preferably are circular, but they may assume any conveient form for qualitative purposes. In other embodiments adsorptive disks are placed in or on the agar. It is only necessary that the structure employed be capable of accepting and retaining a test specimen in such a manner that any HCG contained in the specimen will diffuse into the agar upon standing.

If the agar-containing containers are to be covered with a lid and stored for any period of time, as would be the case with a commercial embodiment of the invention, the deposit of water vapor condensate on the surface of the agar or in the wells must be prevented. It has been found that such deposit of condensate will not occur if the surface of the agar is covered with a material such as Saran or laminated cellophane. Additionally, to permit visual observation of the precipitate which indicates pregnancy, the container is constructed of transparent or translucent material, e.g., polystyrene.

The urine specimen employed for diagnosis in the instant invention need not be the conventionally employed first morning urine. The use of urine other than first morning urine is made possible by the application of a rapid semi-micro concentration technique which forms a part of this invention. In this technique, to a moderate volume of urine, e.g., one to 10 ml., in a receptable such as a test tube, is added an adsorbent under acidic conditions. An acidified suspension of kaolin has been found to be a useful adsorbent for this purpose. The HCG in the urine under these conditions is adsorbed on the kaolin. The urine-kaolin mixture is then centrifuged and the suspernatant fluid discarded. To the kaolin in the test tube is then added an amount of alkaline eluting fluid which is of lesser total volume than was the volume of the urine and which, preferably, contains an acid-base indicator to assure that the resulting mixture is alkaline. Under these conditions of alkalinity the HCG is eluted from the kaolin. Although the alkaline kaolin-HCG mixture can at this juncture be applied directly to the agar, as by placement in the wells, it is preferable to first centrifuge the mixture and transfer the supernatant to the agar, as by pipette.

The instant invention will be more clearly illustrated by reference to the following illustrative examples.

EXAMPLE I

Preparation of the antiserum

Twenty mg. of a commercially available (Organon) HCG having 2,275 I.U. per mg. are dissolved in 2 ml. of water. The resulting solution is emulsified by the addition of an equal volume of Freund's Adjuvant. This emulsion is then injected into a horse subcutaneously at multiple injection sites. After three weeks the multiple subcutaneous injections are repeated using a solution prepared by dissolving 10 mg. (22,750 I.U.) of HCG in 2 ml. of water. After two more weeks the HCG antibody concentration is sufficiently high to permit the use of the antiserum in the practice of this invention.

Five liters of blood were obtained from the horse. This volume of blood provided 2,700 ml. of serum. To this 2,700 ml. of horse serum was added 2,700 ml. of pooled nongravid human serum. The mixture was permitted to stand overnight at 4° C. at which time a precipitate had formed. This precipitate was removed by centrifugation. To three parts of the resulting antiserum were added an additional two parts of pooled nongravid human serum and the mixture allowed to stand in the cold (4° C.) for twenty-four hours. The centrifugation was repeated and the resulting centrifugate passed through a Seitz-type filter pad. The resulting filtrate was satisfactory for use in the subsequent gel diffusion technique.

EXAMPLE II

Materials employed in test procedure kaolin adsorbent

| | | |
|---|---|---|
| Sodium acetate | gm | 12.3 |
| Glacial acetic acid | ml | 75.0 |
| Water | ml | 100.0 |
| Kaolin-Celite[1] | gm | 35.0 |

[1] Kaolin of the Oxford-English type and Celite 545 in a 1:1 w./w. mixture are used.

Eluting fluid

One normal ammonium hydroxide containing 10 mg. of bromthymol blue per 100 ml.

Positive control

This control contains 200 I.U/ml. of HCG (a stock preparation, Organon, of 2,200 I.U./mg. purity was used) in glycine-saline buffer (0.1 Molar glycine in 1% sodium chloride) at pH 8.2 with sodium azide 0.1% added as a preservative and with 10 mg. of bromthymol blue per 100 ml. present as an indicator.

Antihuman chorionic gonadotropin precipitin agar

| | | |
|---|---|---|
| Difco noble agar | gm | 20 |
| Glycine | gm | 75 |
| Sodium chloride | gm | 10 |
| Sodium azide | gm | 1 |
| Water | ml | 1000 | pH adjusted to 7.1 with NaOH.

With 3.5 parts by volume of the molten agar preparation at a temperature of 57° C., there was thoroughly admixed 0.5 part by volume of the antiserum of Example I, and the admixture was used to fill a rectangular transparent plastic plate. This plate was internally 1 inch in width and 3 inches in length wtih vertical sides ⅛ inch in height and with a ¼ inch flange defining the outer upper perimeter of the vertical sides. The agar in the plate was permitted to harden and a series of five circular wells 1/16 inch in diameter and ½ inch apart were made down the center of the long axis of the plate. Each of these wells had a 10 microliter capacity. The surface of the agar was then covered with a sheet of Saran and the plates stored in the refrigerator until needed.

Hereinafter, in these examples, when reference is made to precipitin plates, such plates are the plates of this example.

EXAMPLE III

Test procedure (1) Place 2 ml. of clear urine in 10 x 75 mm. test tube.
(2) Add two drops of kaolin adsorbent and mix.
(3) Allow tube to stand one minute, re-mix and centrifuge for one minute to pack the kaolin adsorbent.
(4) discard the supernatant and drain the tube against adsorbent tissue.
(5) Add one drop of eluting fluid, flick the tube to break up the kaolin button and centrifuge for one minute.
(6) Use a capillary tube to collect the supernatant eluate and transfer enough to fill a well of a precipitin plate.
(7) Add the positive control to a second well and a negative control (the negative control being the same as the positive control, but without HCG) to a third well.
(8) Incubate at 37° C. for four hours and observe for a precipitin reaction which will be seen as a sharply defined circular zone of precipitation around a well. The zone surrounding the test specimen well may be larger or smaller than that surrounding the positive control well depending on the level of the chorionic gonadotropin in the specimen.

For the most reliable test results, the urine specimen will not be more than one day old and will have been kept under refrigeration until tested or will have been fozen if prolonged storage is necessary. The HCG concentration is usually higher in the first morning specimens and for this reason such specimens are preferred for use in the practice of this invention, although they are in no sense essential to the successful practice of the invention.

The eluting fluid contains an indicator to demonstrate that the elution has been conducted at the proper alkalinity. The eluate, when bromthymol blue is the indicator, must be blue or greensih blue (not yellow) for satisfactory results.

Overfilling a well may result in a surface deposit which might be mistaken for a positive reaction or which may mask a true precipitin zone in the agar below.

While in the foregoing specification, a detailed description of the invention has been set forth for the purpose of illustration, it will be apparent to those skilled in the art that many modifications in the details of these embodiments may be made without departing from the spirit and principles of the invention.

What I claim is:

In an immunochemical test for diagnosis of pregnancy based on the observation of the visible precipitate which develops when a specimen derived from urine and containing human chorionic gonadotropin is combined with an anti-serum containing antibodies to human chorionic gonadotropin, the improvement which consists essentially of the combination of the following steps:

(a) preparing crude anti-serum to human chorionic gonadotropin by injecting an appropriate animal with human chorionic gonadotropin and after a period of time bleeding said animal to obtain said crude anti-serum, (b) treating said crude anti-serum with human nongravid serum so as to remove from said anti-serum those antibodies which are non-specific for human chorionic gonadotropin and recovering purified anti-serum, (c) combining said purified anti-serum with a liquid gel-forming material and a minor amount of glycine and depositing a thin layer of the combined materials in a suitable container, (d) after a gel has formed in said container, providing at least one well therein adapted to receive a test specimen, (e) admixing a urine sample taken from the test subject with acidified kaolin whereby the human chorionic gonadotropin is absorbed on said kaolin,
(f) separating said kaolin from the remainder of the urine sample,
(g) desorbing the human chorionic gonadotropin from said kaolin by means of alkaline eluting liquid,
(h) depositing said alkaline eluate in said test well in said container and incubating said container so as to form said visible precipitate which results from the combination of the human chorionic gonadotropin and the antibodies thereto contained in said purified anti-serum.

References Cited in the file of this patent

Hon et al.: "A Rapid Technique for Concentration of Urinary Chorionic Gonadotropin for Pregnancy Testing," Yale J. Biol. Med 27 (3), pages 178–186 (1954).

Got et al.: "Immunoelectrophoretic Analysis of Human Chorionic Gonadotropins," Experentia 15, pp. 480–1, Dec. 15, 1959.

McKean: "Preparation and Use of Antisera to Human Chorionic Gonadotropin," Amer. J. Obstet. Gynec. 80, pp. 596–600, September 1960.

Wide et al.: "An Immunological Pregnancy Test," Acta Endocrinologica, 35, pp. 261–7, October 1960.

Rad et al.: "The Antigenicity of Human Chorionic Gonadotropin," Immunology 4, pp. 1–12, January 1961.

Midgley et al.: "Immunobiological Identification of Human Chorionic Gonadotropin," Proc. Soc. Exp. Biol. Med. 108 (1), pp. 85–89, October 1961.

"UCLA Investigators Report Test Tube Reaction Detects Pregnancy Early," Drug Trade News, 36 (26), page 28, Dec. 25, 1961.

"Hyland 'Immuno-Plate' Pregnancy Test," Drug Trade News 38 (17), page 79, July 22, 1963.